United States Patent
Pearson

[15] 3,678,411
[45] July 18, 1972

[54] LASER Q-SWITCHING MONITORING METHOD AND APPARATUS

[72] Inventor: Durk J. Pearson, Palos Verdes Estates, Calif.

[73] Assignee: TRW Inc., Redondo Beach, Calif.

[22] Filed: Dec. 18, 1970

[21] Appl. No.: 99,355

[52] U.S. Cl. ........................................................ 331/94.5
[51] Int. Cl. ........................................................ H01s 3/02
[58] Field of Search ........................................... 331/94.5

[56] References Cited

UNITED STATES PATENTS

| | | | |
|---|---|---|---|
| 3,295,011 | 12/1966 | Barbini | 331/94.5 |
| 3,480,876 | 11/1969 | Barbini | 331/94.5 |
| 3,526,807 | 9/1970 | Barbini | 331/94.5 |
| 3,521,069 | 7/1970 | De Maria et al. | 331/94.5 |
| 3,545,867 | 12/1970 | Rostas | 331/94.5 |

OTHER PUBLICATIONS

Benson et al., New Laser Technique for Ranging Application. Nerem Record (1962) pp. 34–35.

*Primary Examiner*—William L. Sikes
*Attorney*—Daniel T. Anderson, Donald R. Nyhagen and Jerry A. Dinardo

[57] ABSTRACT

A method of and means for monitoring a Q-switching laser to detect and/or count giant Q-switched pulses emitted by the laser. At least a fraction of the light energy from the laser is focussed within a spark gap biased to a voltage slightly less than its breakdown voltage in a manner such that each giant pulse triggers a spark discharge across the gap. The giant pulses are detected and/or counted by detecting and/or counting the current pulses which occur during the spark discharges.

11 Claims, 8 Drawing Figures

PATENTED JUL 18 1972

Durk J. Pearson
*INVENTOR.*

BY
*Donald R. Nyhagen*
ATTORNEY

Durk J. Pearson
INVENTOR.

LASER Q-SWITCHING MONITORING METHOD AND APPARATUS

BACKGROUND OF THE INVENTION

1. Field of the Invention

This invention relates generally to the field of lasers and more particularly to a method of and means for monitoring a Q-switching laser to detect and/or count so-called giant Q-switched light pulses emitted by the laser.

2. Prior Art

As is well known to those versed in the laser art, lasers may be designed for operation in two different modes, commonly referred to as normal mode and Q-switching mode. A laser operating in the normal mode emits relatively low energy light pulses continuously so long as the laser is properly pumped. A laser operating in the Q-switching mode emits periodic bursts of high energy light, termed giant or Q-switched light pulses, whose peak power may be on the order of many megawatts. In addition to their vastly different peak power level, the normal mode and Q-switched light pulses differ greatly in pulse direction. An average normal mode pulse, for example, has a time duration in the microsecond range, i.e. 20 to 30 microseconds, while the duration of the average Q-switched pulse is in the nanosecond range, i.e. 20 to 30 nanoseconds.

One common method of Q-switching involves the use of a saturable dye cell which is inserted in the laser cavity. This cell has the effect of raising the threshold population inversion required for the onset of laser emission. When this relatively high threshold inversion is reached, normal laser emission begins. If this laser emission is sufficiently intense, it will partially bleach the saturable absorber, thereby reducing the cavity losses. As a result, the laser radiation density increases further, and the saturable filter becomes still more transparent. The net result is that a small amount of initial laser emission bleaches the saturable filter, thereby setting the stage for the formation of a giant, or Q-switched, laser pulse. A major reason for the use of a dye cell in a laser for holography or interferometry is that it increases the coherence length of the laser, i.e. it produces more monochromatic light allowing a greater depth of field in the hologram or interferogram. It also prevents contour fringes caused by multifrequency operation of the laser. The mechanism of this is that there is a standing wave electromagnetic field in the laser cavity in which the dye cell is inserted. It bleaches at the loops of the electromagnetic field and remains opaque at the nose, thereby forming a multilayer interference filter which is selected for particular frequency of light. The use of the dye cell in conjunction with an output etelon reflector is common in the art to produce light of sufficient coherence for holography and interferometry.

Owing to its extremely short pulse duration, high pulse power, and other unique characteristics, a Q-switched laser, particularly one in which Q-switching is accomplished by a saturable dye cell, is capable of many applications for which a normal laser is either ill-suited or incapable. One of these applications is holography, especially interferometric and reflected light holography. For example, both theory and actual experiments have demonstrated that interferometric holography is impossible with a normal mode solid state laser and can be performed satisfactorily only with a Q-switched solid state laser, particularly one which employs a saturable dye cell for Q-switching. However, a Q-switched laser is also unsuitable under certain conditions for certain types of interferometric holography. One of these conditions is the emission of multiple giant Q-switched pulses. Thus, if the pump energy applied to the laser is sufficiently above the threshold, more than one giant pulse may be produced. Both normal mode lasing and multiple pulse switch lasing are unsuitable for certain types of interferometric holography for the reason that interferometric fringes are either completely absent or their contrast is so low as to make them meaningless or the fringes comprise several confusing fringe systems.

For some types of interferometry it is desirable that the laser produce one, and only one, giant pulse each time the pump lamp is fired. Other types of interferometry require the production of two, and only two, giant pulses during each pump lamp flash. Generally, it is desired to know the time difference between the two giant pulses. Still, other types of interferometry, for example those involving non-destructive testing of composites, require that several giant pulses be produced, for example six pulses. In this case it is desirable to know the exact number of pulses produced since the complexity in appearance of the fringe system can depend both upon the number of giant pulses and upon the nature of the material that is being tested.

Owing to the above characteristics of Q-switched lasers, it is desirable, if not essential, in many laser applications, particularly holographic interferometry, to monitor the laser output for the purpose of determining whether the laser fires in the normal mode or in the Q-switching mode and, if Q-switching occurs, whether the laser emits only one or more than one giant pulse. In the event that more than one giant pulse occurs, it may also be desirable to know the number of such pulses.

The current method of monitoring a Q-switched laser involves the use of laser output monitoring equipment including a photodiode, power supply, high frequency oscilloscope, and Polaroid scope camera. This monitoring equipment is quite expensive, occupies substantial space, and requires a Polaroid scope trace photograph of every laser pulse. These disadvantages of the monitoring equipment discourage its use by most experimenters who simply assume the laser remains in proper adjustment and operates in the proper single pulse Q-switching mode. Unfortunately, however, dye cell lasers are prone to drift out of their rather critical adjustment with the result that much time and effort is wasted in repeating experiments which fail because of improper laser adjustment. Accordingly, there is a need for an improved Q-switching monitor and monitoring technique.

As part of the prior art, it is well-known that the output of the Q-switched laser focussed through a lens will produce a breakdown in the air. If the entire output of the laser is focussed through the lens this results in a bright flash and a rather loud snap. The disadvantage of using this technique to detect Q-switching is first that it requires most or all of the energy of the laser to produce a flash bright enough to be seen and a snap loud enough to be heard above the typical laboratory noise; and secondly that it does not count the number of Q-switch pulse which may occur during a pump lamp flash. Another usage in prior art is use of a Q-switch laser pulse focussed through a lens to break down the spark gap to control large amounts of power. For example, in thermonuclear fusion experiments hundreds of thousands of jewels are controlled by Q-switch laser controlled spark gaps. In this case, however, information is not extracted from the laser beam as to the number of pulses produced this is strictly a matter of controlling large amounts of power. Here the Q-switch laser is used rather as a switch for precision synchronizing of a number of independent spark gaps. These spark gaps in their associated circuitry are incapable of determining the number of Q-switch pulses produced within a given pulse train.

SUMMARY OF THE INVENTION

The present invention provides such an improved Q-switching monitor and monitoring method. According to the invention, at least a fraction of the light energy from the laser is optically focussed within a spark gap between two spaced electrodes. Preferably, this gap contains a gas which ionizes and deionizes rapidly. The electrodes are connected to a high voltage charging circuit which is set to bias the electrodes to a voltage slightly less than the break down voltage of the spark gap, such that a spark discharge across the gap is triggered by each giant pulse from the laser but not by the light energy from the laser in its normal lasing mode. The charging circuit is designed to recharge with sufficient rapidity to produce a spark discharge in response to each giant pulse. These spark discharges create current pulses in the charging circuit which are detected or counted to monitor the giant laser pulses. To this end, the monitor is equipped with a counter which is capable of responding to the charging circuit current pulses and is connected to the circuit in such a way as to register counts in response to the pulses.

A variety of spark gap charging circuits are disclosed. Also disclosed are certain novel electrode configurations. One of these electrode configurations is designed to minimize the laser energy and charging circuit power requirements for triggering of the monitor by the giant laser pulses. The invention contemplates various ways of transmitting laser light energy to the monitor. According to the preferred practice of the invention, a beam splitter is employed to reflect to the monitor a small fraction of the laser light energy. In some cases, the dye cell can be used as the beam splitter.

DESCRIPTION OF THE PREFERRED EMBODIMENTS

Figure 1:
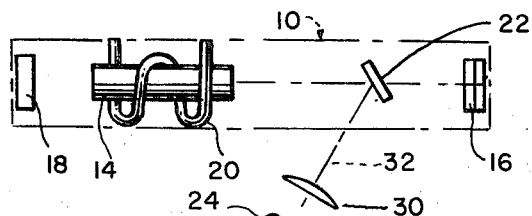
FIG. 1 illustrates a Q-switched laser and Q-switching monitor according to the invention.

FIG. 1 illustrates a Q-switched laser 10 and a Q-switching monitor 12 according to the invention. Laser 10 is conventional and hence need not be described in great detail. Suffice it to say that the illustrated laser is a Q-switched ruby laser having a ruby rod 14 within a laser cavity between front and rear mirrors 18, 16 the front mirror being an etalon. Surrounding the rod 14 is a pump source 20. Within the laser cavity, between the rod and rear mirror, is a saturable absorber Q-switch 22 in the form of a dye cell.

The operation of laser 10 is well known and was briefly explained earlier. Accordingly, there is no need to repeat the description here. Suffice it to say that the laser, if not maintained in proper adjustment and particularly if its dye cell 22 is not maintained in proper adjustment, may operate in a normal lasing mode. Moreover, when operating, in the Q-switching mode, more than one giant pulse may be produced if the pump energy supplied to the laser is sufficiently above the laser threshold. As mentioned earlier, such multiple giant pulse lasing is also unsuitable for holographic interferometry and other applications.

The present Q-switching monitor 12 is designed to inform the laser operator in which mode the laser is operating and particularly when the laser is operating in a single giant pulse Q-switching mode. To this end, the monitor has a pair of spaced electrodes 24 defining an intervening spark gap 26. Connected to these electrodes is a high voltage charging circuit 28 for biassing the electrodes to a voltage slightly less than the breakdown voltage of the gap 26. Preferably, the gap contains a gas which ionizes and deionizes rapidly. A suitable gas for this purpose is air at one atmosphere pressure and with normal water vapor content.

Adjacent the spark gap 26 is a converging lens 30. In the particular embodiment under discussion, the lens is arranged so that its axis 32 passes through the gap in the plane of the gap. The lens is spaced from the gap a distance such that a focal point of the lens is located in the gap between the electrodes 24.

Means are provided for transmitting at least a fraction of the light energy from the laser 10 to the Q-switching monitor 12 along the axis 32 of and through the lens 30. In the particular inventive embodiment shown, the entrance face of the laser dye cell 22, that is the face through which the light enters the cell, is used as a beam splitter for reflecting a fraction of the laser light energy to the monitor 12. Other types of beam splitters may also be used for this purpose.

During operation of the equipment, as thus far described, a fraction of the laser light energy is reflected to the Q-switching monitor 12 through the lens 30 which focusses the energy in the spark gap 26. When the laser emits a giant pulse, the laser light energy reflected to the monitor and focussed within the spark gap is sufficient to ionize the gas in the gap, thereby causing the gap to break-down and trigger a spark discharge across the gap. The light energy received by the monitor 12 in the normal lasing mode of the laser 10, on the other hand, is insufficient to break down the spark gap and trigger a spark discharge across the gap. In this regard, it has been found that only a few percent of the energy of a giant pulse, when focussed in the gap is sufficient to trigger a spark discharge. Thus, the required triggering energy may be as little as 4 percent or less of the giant pulse energy, representing focussed trigger energy on the order of a few millijoules.

A spark discharge across the spark gap 26 produces a current pulse in the charging circuit 28. According to the present invention, the charging circuit embodies means 36 for detecting and indicating to the laser operator the occurrence of this current pulse and, thereby, emission of a giant pulse by the laser 10.

It is now evident that the Q-switching monitor 12, as it is described to this point, discriminates between the normal lasing and Q-switching modes of the laser 10 and informs the laser operator when Q-switching occurs. As noted earlier, it is also desirable or essential in many applications to discriminate between single and multiple giant pulse Q-switching and to inform the laser operator when the multiple giant pulses occur. Occasionally, it may also be desirable or necessary to know the number of giant pulses which occur. To this end, the current pulse detection means 36 comprises a pulse counter for counting the current pulses and hence the giant laser pulses and displaying the pulse count. It is evident, of course, that such multiple pulse detection and counting requires a spark gap charging circuit 28 which recharges sufficiently rapidly following each spark discharge across the gap 26 to permit detection and counting of successive giant pulses.

In this latter regard, it will be observed that the illustrated charging circuit 28 is a simple R-C circuit including a high voltage power supply 38 and charging condensor 40 in parallel with the electrodes 24 and a charging resistor 46 in series between the power supply and condensor. The LRC time constant of the circuit is kept small so that each spark discharge will be extinguished and the spark gap rebiased to the proper voltage with the rapidity required for multiple pulse detection.

Pulse counter 36 may comprise any pulse counter capable of detecting and counting the current pulses produced in the charging circuit 28 by a series of giant laser pulses. The counter may be connected across either charging condensor 40, or the charging resistor 46, as shown.

Figure 2:
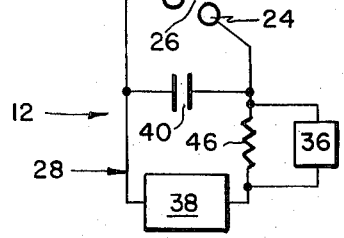
FIGS. 2 through 6 illustrate modified Q-switching monitors according to the invention.
Figure 2:
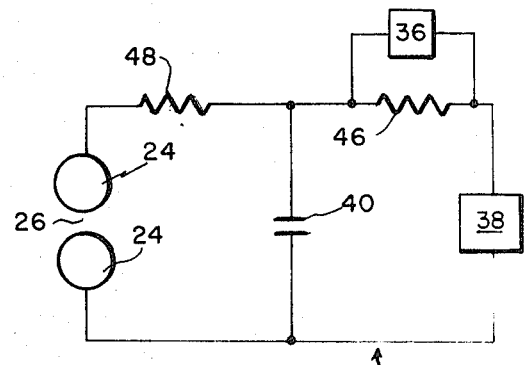
Figure 3:
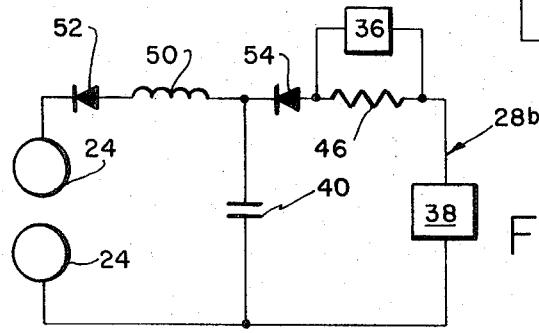
Figure 4:
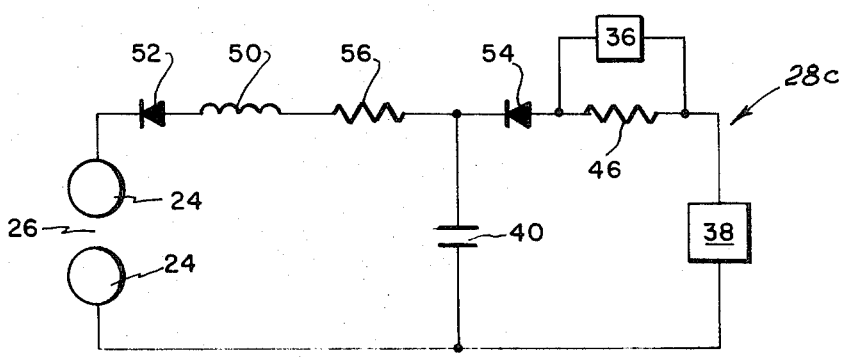

FIGS. 2 through 4 illustrate alternative charging circuit configurations which may be used in the Q-switching monitor 02. These latter circuits are simple variations of the basic circuit in FIG. 1. Accordingly, a detailed description of the alternative circuits is un-necessary. Suffice it to say that the charging circuit 28$a$ in FIG. 2 has a damping resistor 48 to prevent oscillations across the spark gap 26 due to ringing from the condensor 40 and parasitic inductance. Counter 36 may be connected across either resistor 46, 48, or the condensor 40. Charging circuit 28$b$ of FIG. 3 has an inductor 50 and diodes 52, 54. Condensor 40 and inductor 50 produce RF oscillations across the spark gap 26. Diode 52 functions as a half wave rectifier which rectifies these RF oscillations. The spark gap 26 deionizes during a half wave in which conduction is blocked. In this case, pulse counter 36 is connected across the charging resistor 46 and is shielded from response to the RF oscillations by diode 54. The modified charging circuit 28$c$ of FIG. 4 is like that of FIG. 3 except for the addition of a damping resistor 56.

Figure 5:
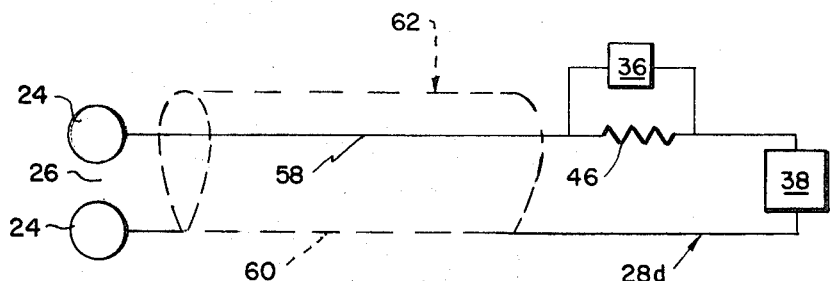
Figure 6:
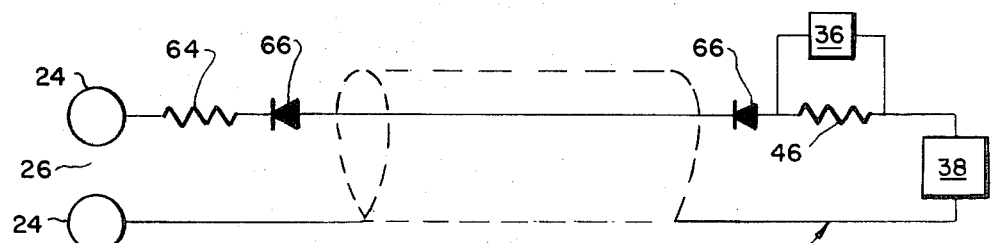

FIGS. 5 and 6 illustrate modified charging circuits 28d and 28e in which the spark gap electrodes 24 are connected to the power supply 38 through the center conductor 58 and outer shield 60 of a coaxial cable 62 which functions as a charging condensor. The charging resistor 46 is connected in series in the center conductor and the counter 36 is connected across the resistor. In FIG. 6, a damping resistor 64 and diodes 66 are also connected in the center conductor to rectify and damp oscillations across the spark gap and shield the counter 36.

Figure 7:
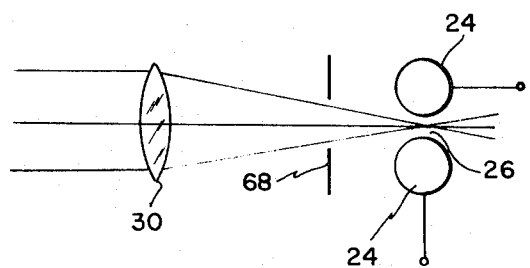
FIG. 7 illustrates an electrode shielding arrangement for the monitor electrodes.

As noted earlier, the Q-switching monitor 12 is not intended to be triggered by light energy from the laser 10 in its normal lasing mode. However, under certain conditions this may occur unless prevented in some way. One way of preventing normal lasing response of the monitor is to place a light baffle 68 between the electrodes 24 and lens 30, as shown in FIG. 7 to prevent the laser beam from impinging the electrodes. This baffle also prevents vaporization and erosion of the electrodes by the laser beam. Another method involves construction of the electrodes from a material having a sufficiently high work function that the laser quanta do not possess sufficient energy to cause photoelectron emission. For ruby lasers and lasers of longer wavelengths, an electrode work function greater than 1.8eV is sufficient. Examples of suitable electrode material for a ruby laser monitor are silver, aluminum, copper, iron, molybdenum, nickel, platinum, tantalum, tungsten, brass, and stainless steel.

Figure 8:
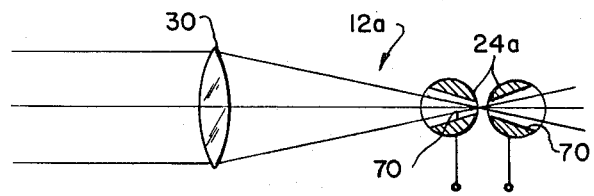
FIG. 8 illustrates a modified electrode configuration for the monitor.

In the Q-switching monitors described to this point, the laser beam passes through the spark gap 26 in the plane of the gap. FIG. 8 illustrates a modified Q-switching monitor 12a in which the beam passes through the gap in a direction normal to the plane of the gap. In this case, the electrodes 24a having conical openings 70 on a common axis normal to the gap plane and the lens 30 is arranged on the axis such that the laser energy passes through the electrodes and is focussed in the gap. This electrode arrangement is desirable for the reason that the ionization region of the focussed laser energy extends a distance along the beam axis. Accordingly, the arrangement of FIG. 8 permits triggering of the Q-switching monitor at reduced power. Also, no shielding is required to prevent normal mode triggering of the monitor.

What I claim as new in support of Letters Patent is:

1. A Q-switching monitor for a Q-switching laser, comprising:
   a pair of spaced electrodes defining an intervening spark gap;
   means including a converging lens positioned with its optic axis passing through said gap and a focal point of the lens located within said gap for focussing light from said laser within said gap;
   rapidly rechargable circuit means connected to said electrodes for impressing across said electrodes a voltage slightly less than the breakdown voltage of said gap, such that each giant Q-switched pulse emitted by said laser triggers a spark discharge across said gap between said electrodes and produces a current pulse in said circuit means; and
   said circuit means including a counter for counting current pulses produced by successive giant pulses.

2. A laser Q-switching monitor according to claim 1 wherein:
   said electrodes have geometric centers located in a common plane normal to the plane of said gap;
   said lens axis lies in said common plane and passes approximately through said electrode centers; and
   said electrodes have openings on said beam axis through which the laser beam passes.

3. A laser Q-switching monitor according to claim 1 wherein:
   said lens axis lies in the plane of said gap.

4. A laser Q-switching monitor according to claim 3 including:
   a shield opaque to said laser beam positioned between said lens and electrodes and having an opening on said lens axis which is sized to shield said electrodes from direct impingement by said laser beam.

5. In combination:
   a Q-switching laser;
   a Q-switching monitor for said laser comprising a pair of spaced electrodes defining an intervening spark gap; means including a converging lens positioned with its optic axes passing through said gap and a focal point of the lens located within said gap for transmitting light from said laser through and focussing said light within said gap; rapidly rechargeable circuit means connected to said electrodes for impressing across said electrodes a voltage slightly less than the breakdown voltage of said gap, such that each giant Q-switched pulse emitted by said laser triggers a spark discharge across said gap between said electrodes and produces a current pulse in said circuit means; and
   a counter for counting current pulses produced by successive giant laser pulses.

6. The combination according to claim 5 wherein:
   said transmission means comprises a beam splitter along and at an oblique angle relative to the axis of said laser for reflecting a fraction of the light energy of the laser beam through said lens along its optic axis.

7. The combination according to claim 6 wherein:
   said laser includes a saturable dye cell disposed in and at an oblique angle relative to the path of light emitted from said laser; and
   said beam splitter comprises the surface of said cell through which light from said laser enters said cell and from which a fraction of the incident light energy is reflected through said lens along its optic axis.

8. The combination according to claim 5 wherein:
   said electrodes have geometric centers located in a common plane normal to the plane of said gap;
   said lens axis lies in said common plane and passes approximately through said electrode centers; and
   said electrodes have openings on said beam axis through which passes the laser beam transmitted to said monitor.

9. The combination according to claim 5 wherein:
   said lens axis lies in the plane of said gap.

10. The combination according to claim 9 including:
    a shield opaque to said laser beam positioned between said lens and electrodes and having an opening on said lens axis which is sized to shield said electrodes from direction impingement by the laser beam transmitted to said monitor.

11. The method of monitoring giant Q-switched pulses from a Q-switching laser which comprises the steps of:
    focussing at least a portion of the light energy from said laser within a spark gap between two spaced electrodes;
    impressing across said electrodes a voltage slightly less than the breakdown voltage of said gap such that each giant Q-switched pulse from said laser triggers a spark discharge across said gap; and
    counting the current pulses produced by successive giant pulses.

* * * * *